United States Patent [19]

Bartlett

[11] Patent Number: 5,318,222
[45] Date of Patent: Jun. 7, 1994

[54] MAILER FOR COMPUTER DISKS

[75] Inventor: Michael Bartlett, Somerville, Mass.

[73] Assignee: Ames Safety Envelope Co., Somerville, Mass.

[21] Appl. No.: 11,951

[22] Filed: Feb. 1, 1993

[51] Int. Cl.$^5$ .............................................. B65D 27/08
[52] U.S. Cl. ................................... 229/72; 229/68 R; 229/70; 229/313; 206/444
[58] Field of Search ................. 229/68 R, 70, 72, 313; 206/444, 311, 312, 472

[56] References Cited

U.S. PATENT DOCUMENTS

| 697,971 | 4/1902 | Bonnaffon . | |
|---|---|---|---|
| 1,163,459 | 12/1915 | Rheutan . | |
| 1,276,101 | 8/1918 | Oakley | 229/72 |
| 2,931,558 | 4/1960 | Zalkind | 229/72 |
| 3,129,872 | 4/1966 | Lutwack . | |
| 3,399,823 | 9/1968 | Johnson . | |
| 3,556,391 | 1/1971 | Kosterka | 229/68 R |
| 3,717,297 | 2/1973 | Perry . | |
| 3,826,360 | 7/1974 | Shore | 229/72 X |
| 4,317,538 | 3/1982 | Alter . | |
| 4,620,630 | 11/1986 | Moss | 229/68 R X |
| 4,640,413 | 2/1987 | Kaplan et al. | 229/68 R X |
| 4,653,639 | 3/1987 | Traynor | 229/72 X |
| 4,694,954 | 9/1987 | Moss . | |
| 5,154,284 | 10/1992 | Starkey | 206/444 X |

Primary Examiner—Allan N. Shoap
Assistant Examiner—Jes F. Pascua
Attorney, Agent, or Firm—Fish & Richardson

[57] ABSTRACT

A mailer for disks. The mailer has first and second pockets for receiving disks, each pocket formed of front and back rectangular panel members joined at at least one pair of corresponding edges and unconnected on at least one pair of corresponding edges. The pockets are foldably attached by a spine at an edge of each of said pockets. There is a sealing member for adhering the first pocket to the second pocket to maintain the mailer in a closed conformation. At any pocket edge not retaining the received disk by the joined edges, the spine, or the sealing member, the disk is retained in the pocket by retaining means.

15 Claims, 5 Drawing Sheets

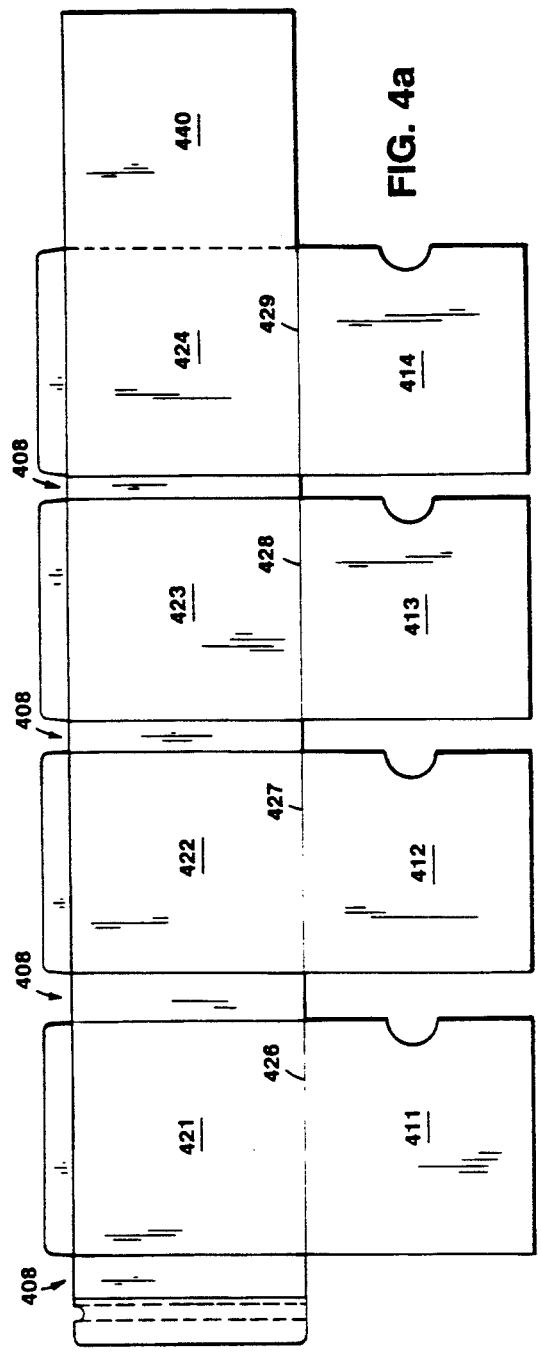
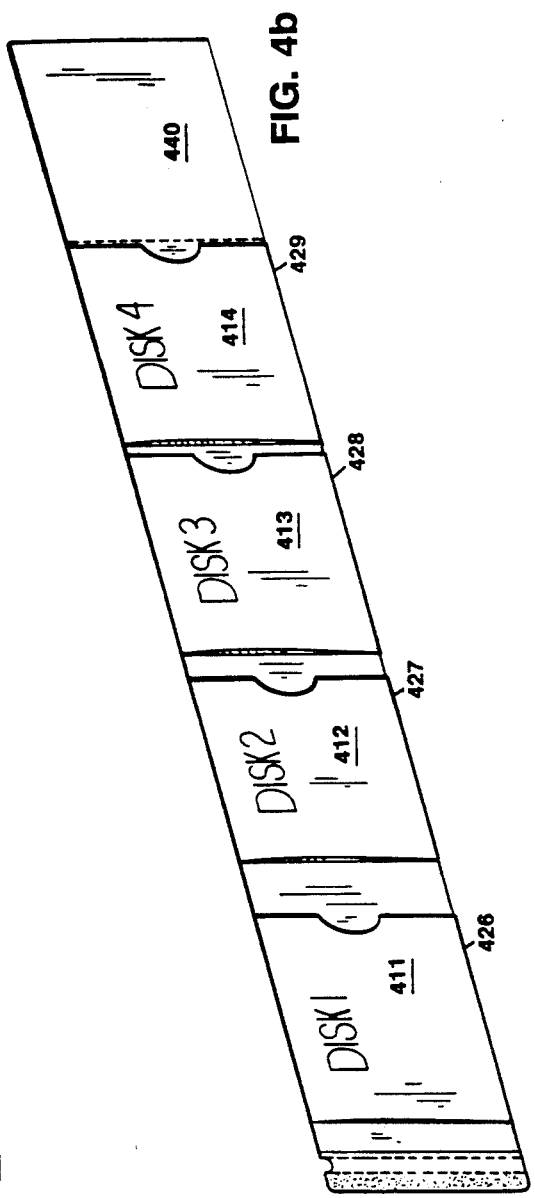
FIG. 4a
FIG. 4b

MAILER FOR COMPUTER DISKS

BACKGROUND OF THE INVENTION

The invention relates to mailers for mailing computer disks.

When a disk is to be mailed, it must be enclosed in a mailer. The mailer must comply with postal regulations—size requirements, address positioning and clarity, optical character scannability for preferred rates, etc. It is desireable that the mailer protect the disk from shipping damage, and offer some security against tampering during transit.

SUMMARY OF THE INVENTION

In general, in a first aspect, the invention features a mailer for disks. The mailer has first and second pockets for receiving disks, each pocket formed of front and back rectangular panel members joined at at least one pair of corresponding edges and unconnected on at least one pair of corresponding edges. The pockets are foldably attached by a spine at an edge of each of said pockets. There is a sealing member for adhering the first pocket to the second pocket to maintain the mailer in a closed conformation. At any pocket edge not retaining the received disk by the joined edges, the spine, or the sealing member, the disk is retained in thepocket by retaining means.

Preferred embodiments include the following features. The mailer has a card joined at a perforation to one of the pockets; the card can be removed from the mailer. The sealing member is a sealing flap with an adhesive face.

In a second aspect, the invention features a mailer for disks where the first and second pockets each comprise front and back panels joined at at least two pairs of corresponding edges and unconnected on at least one pair of corresponding edges. A spine foldably attaches the pockets at an edge of each of the pockets. There is a sealing member for adhering the first pocket to the second to maintain the mailer in a closed conformation.

Preferred embodiments include the following features. The mailer has a card joined at a perforation to one of the pockets; the card can be removed from the mailer. The card and the back panel members form a continuous panel of the mailer blank. The adhesive of the sealing flap has a peel-off backing. The sealing flap has a frangible perforation to facilitate opening of the mailer.

In a third aspect, the invention features a mailer for disks where the first and second pockets each comprise front and back rectangular panels joined at their top and bottom edges and unconnected on at least one side edge. A spine foldably attaches the pockets at an edge of each of the pockets. A sealing flap, foldably connected to the first pocket at the edge remote from the spine, has an adhesive face configured to permit the sealing flap to be adhered to the second pocket, thereby maintaining the mailer in a closed conformation.

Preferred embodiments include the following features. The mailer has a card joined to the second pocket. The fold joining the card is frangible to allow the card to be removed from the mailer. The adhesive of the sealing flap has a peel-off backing. The sealing flap has a frangible perforation to facilitate opening the mailer. The spine and sealing flap have spacing members to accommodate the thicknesses of the first and second pockets. An open edge of each of the pockets has a thumb notch to facilitate removal of the disks.

A mailer according to the invention offers the following advantages. Two disks may be mailed together. The diskettes are protected from rough handling during transit. Insertion of the disks and sealing of the mailer for mailing is easy. The mailer may incorporate a card that may be used, for instance, as a warranty registration card. This card is attached to the mailer so that it will remain securely with the mailer during handling by the sender's mailing department and during transit, and functions as a stiffener to further protect the enclosed disks. Some embodiments of the mailer are tamper-evident, others are resealable so that the mailer can be used as a storage case for the disks.

Other advantages and features of the invention will become apparent from the following description of preferred embodiments, and from the claims.

BRIEF DESCRIPTION OF THE DRAWING

FIG. 4a is a plan view of a cardboard blank for second embodiment.

FIG. 4b is a perspective view of the blank folded into its final form.

DESCRIPTION OF THE PREFERRED EMBODIMENTS

Figure 1:
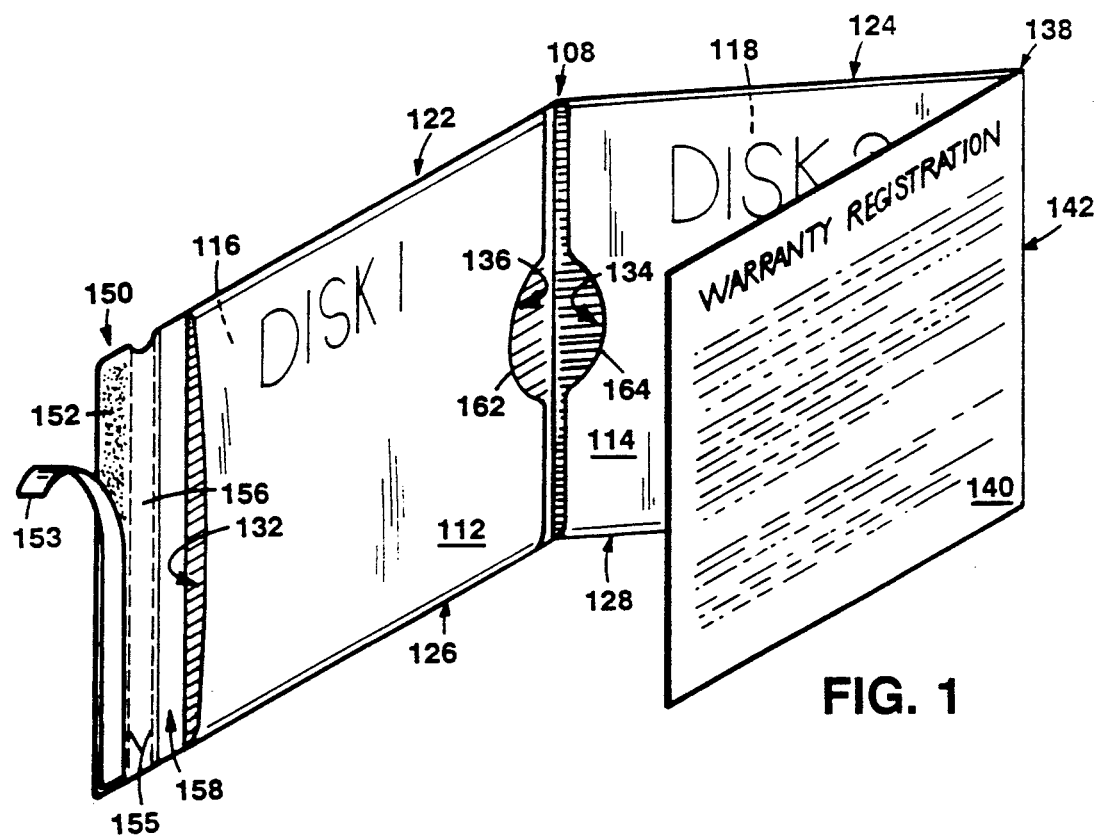
FIG. 1 is a perspective view of a first embodiment of the mailer in an open conformation.

The mailer of FIG. 1 comprises two pockets and a sealing flap 150. The first pocket consists of a front panel 112 and a back panel 116 joined along top and bottom edges 122,126, and open at left and right edges 132,136. The second pocket consists of a front panel 114 and a back pane) 118 joined along top and bottom edges 124,128, and open at left and right edges 134,138. The two pockets are joined by a spine 108. The sealing flap has an adhesive surface 152 that may be adhered to the back panel 118 of the second pocket, to hold the mailer in the closed conformation of FIGS. 2a and 2b.

The panels 112, 114, 116, 118 are preferably somewhat larger than the disks to be mailed, so that the mailer can absorb corner denting, thereby protecting the disks within.

The sealing flap may be attached to the first pocket by a spacing member 158 of width sufficient to accommodate the thickness of the pocket panels and the disks within them. The sealing flap may have a frangible portion to ease opening of the mailer, for instance the perforation lines 155. Between the perforation lines is a tear strip 156.

The spine 108 may be a simple fold, or may comprise a spacing member between two folds to accommodate the thickness of the disks and pocket panels.

A card 140 may be joined to the second pocket at a fold 142. This card functions as a stiffener to protect the disks during mailing, and may be printed, e.g., a warranty registration card to be returned to the sender.

Preferably, an open edge of each pocket is relieved, for instance by the thumb notches 162,164, to ease the removal of the disks from the pockets.

Figure 2A:
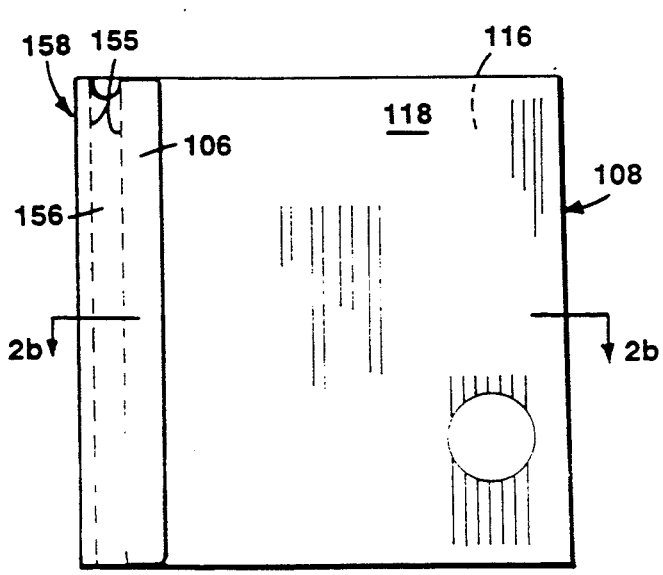
FIGS. 2a and 2b are, respectively, plan and sectional (along section line 2b–2b of FIG. 2a) views of the first embodiment in its closed conformation.
Figure 2B:
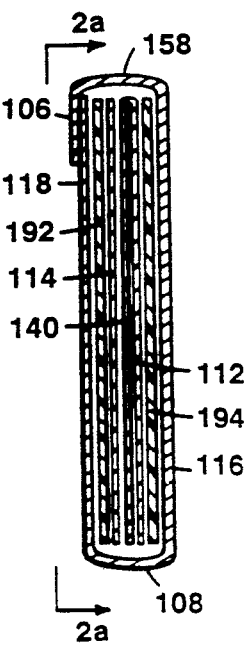

Referring to FIGS. 2a and 2b, disks 192 and 194 can be inserted into the two pockets and the mailer sealed into its closed conformation by removing the release strip 153 covering the adhesive 152 and adhering the adhesive surface 152 of flap 150 to back panel 118. The sender can address the mailer on back panels 116 or 118, now exposed. The recipient opens the mailer by tearing away the tear strip 156 at perforations 155 of the sealing flap. The warranty card 140 is now exposed; the recipient may remove the Card at perforations 142 and mail it back to the sender.

Figure 3A:
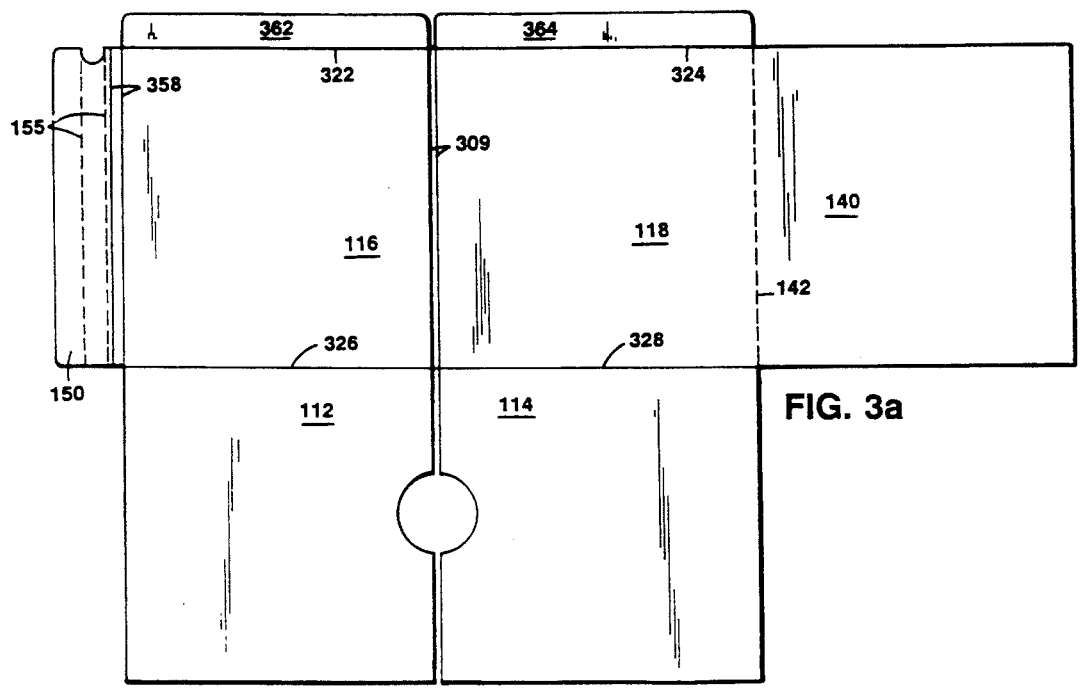
FIG. 3a is a plan view of a cardboard blank for the first embodiment.

FIG. 3a shows a blank of card stock. The card stock is stiff enough to provide protection to the disks that will be enclosed in the mailer, yet light for manufacturability and to reduce mailing costs, e.g., 24-point SBS. The card 140, back panels 116,118 and sealing flap 150 form a continuous, straight back panel, with front panels 112 and 114 and gluing flaps 362,364 projecting from it. Front panels 112 and 114 are the same size, as are back panels 116 and 118 (within manufacturing tolerances, and possibly allowing for additional space that may be needed to attach, e.g., sealing flap 150) The front side of the blank (the side opposite that shown in FIG. 3a) may be imprinted, for instance with retail display information on back panel 116, addressee and return address information on back panel 118, disk labels and directions on front panels 112 and 114. Card 140 may be imprinted on one or both sides. Lines 309, 322, 324, 326, 328, and 358 are scored for folding, and lines 142 and 155 are perforated.

Figure 3B:
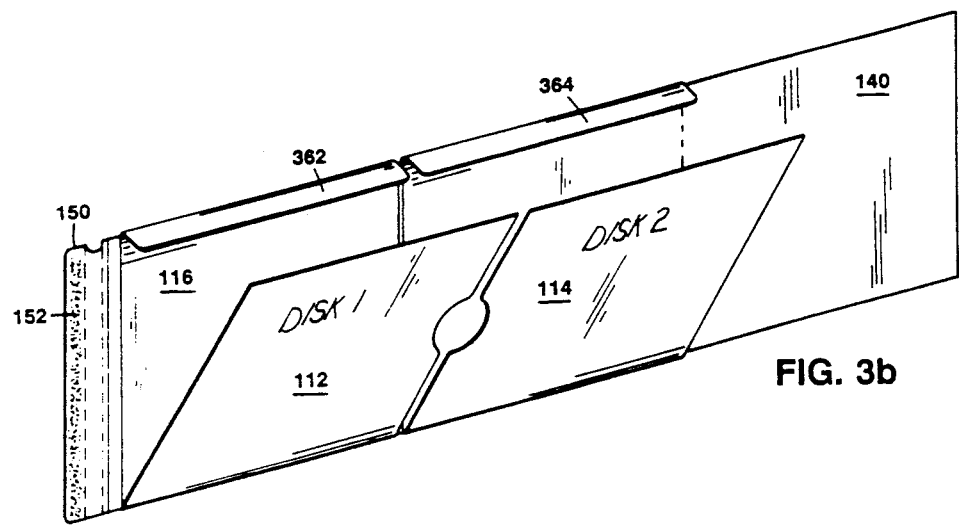
FIG. 3b is a perspective view of the blank folded nearly into its final form.

Referring to FIG. 3b, the blank of FIG. 3a is folded and glued to form the mailer of FIG. 1. Front panels 112 and 114 are folded up and permanently glued to gluing flaps 362 and 364. The adhesive 152 is applied to sealing flap 150; the adhesive is preferably covered with a paper or plastic release backing that can be removed when the mailer is to be sealed into its closed conformation.

Manufacture of the mailer is now complete and the mailer is ready for use by a sender, for instance a software vendor. The sender inserts disks into the two pockets, removes the waxed paper release backing from adhesive face 152, folds the mailer into the closed conformation of FIGS. 2a and 2b, and sealing flap.

Other embodiments are within the following claims.

A disk may be retained in its pocket by means other than the joined edges of the pocket, the spine, or the sealing flap. This case can be illustrated in FIG. 3, by considering the case when flaps 362,364 are left unglued to pocket front panels 112, 114. When this alternate mailer is sealed in its closed conformation, the flaps 362,364 will be held in place by friction and will function as retainer flaps to retain the disks in the pockets. An advantage of this configuration is that it eliminates the manufacturing step of gluing the flaps.

The disk mailer of the invention is not limited to two disks. Referring to FIGS. 4a and 4b, additional pockets can be added to the embodiment of FIG. 3. Each pocket has a front panel 411–414 and a back panel 421–424, joined at folds 426–429 and a sequence of spines formed of parallel folds. This mailer will be folded up from the warranty card 440 on the right to the leftmost pocket 411,421 on the left. Note that each succeeding spine's spacing member increases in width to accommodate the thickness of each pocket and disk.

Figure 5A:
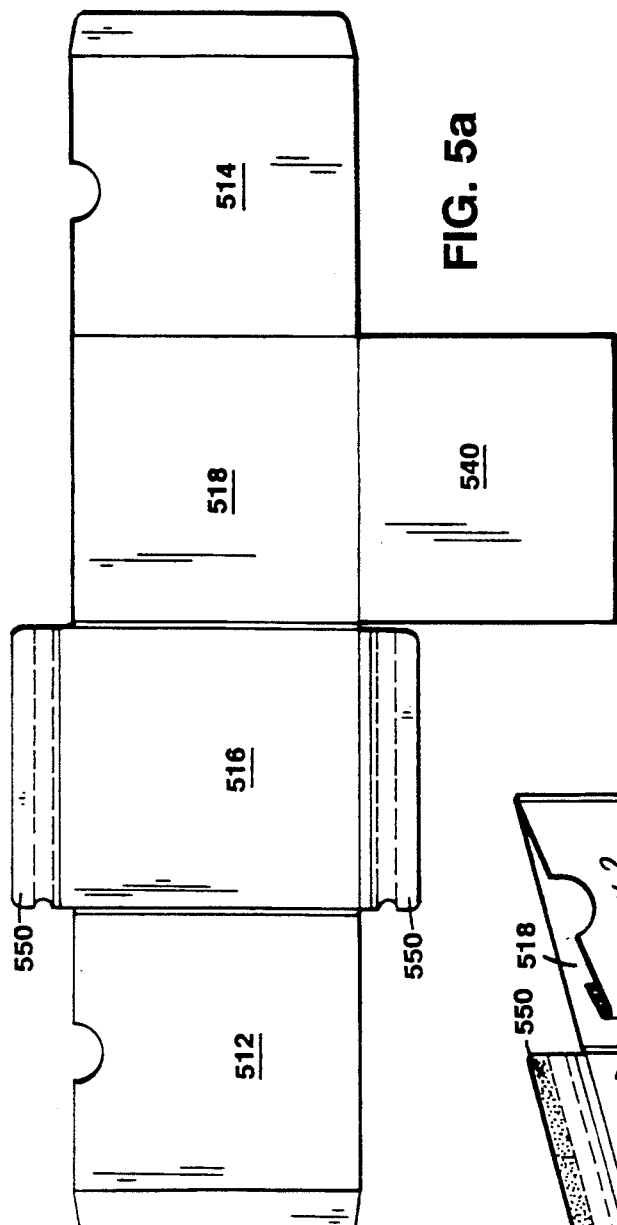
FIG. 5a is a plan view of a cardboard blank for a third embodiment.
Figure 5B:
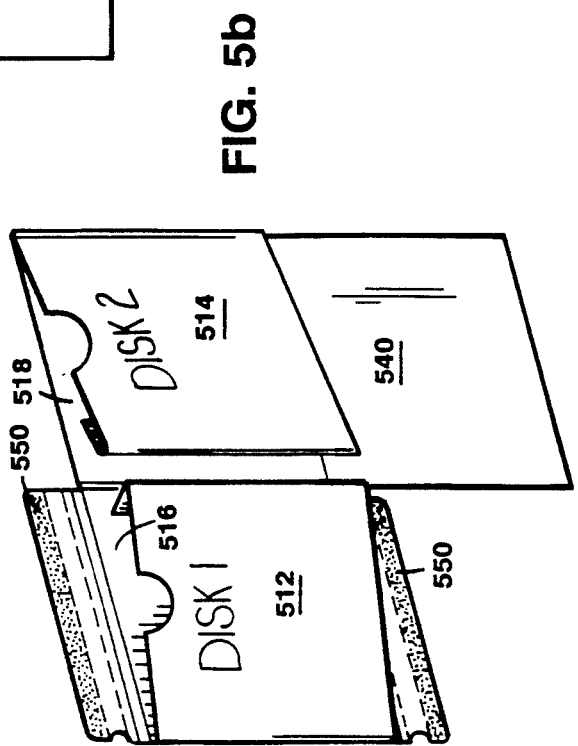
FIG. 5b is a perspective view of the blank folded nearly into its final form.
Figure 6:
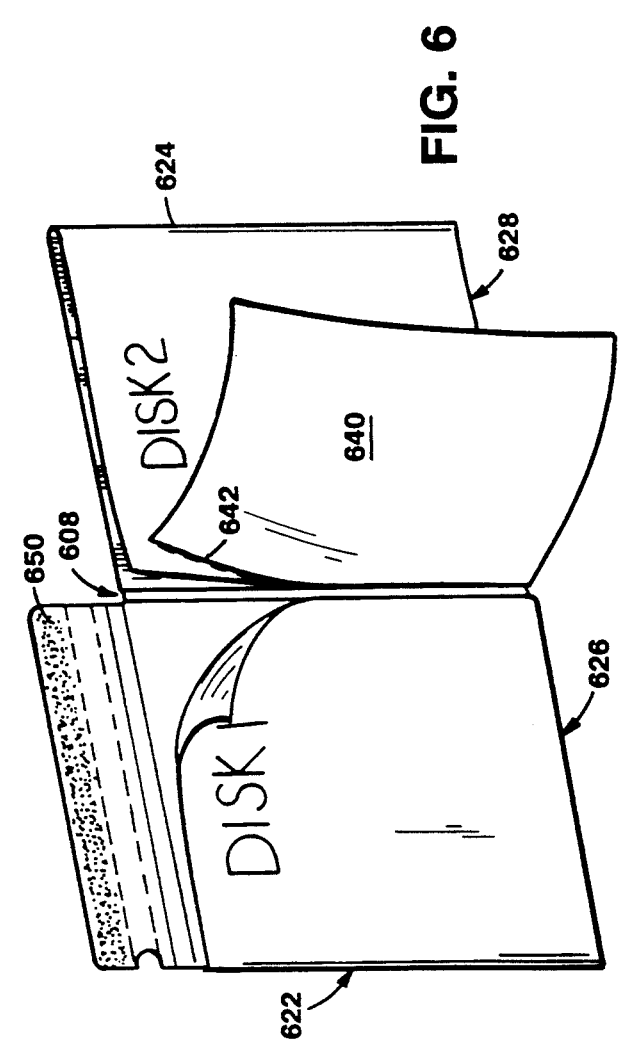

Referring to FIGS. 5 and 6, other arrangements of the panels and flaps are possible. For instance, in FIGS. 5a and 5b, the front 512,514 and back 516,518 panels are joined at their right and left edges and the pockets open at their top and bottom edges. The sealing member comprises two sealing flaps 550 joined to the back panel 516 of the first pocket. A card 540 may be joined to the back panel 518 of the second pocket.

In the embodiment of FIG. 6, the joined sides of the pockets need not be opposite each other. The left pocket is closed at its left and bottom edges 622,626 and the right pocket is closed at its right and bottom edges 624,628. A sealing flap 650 closes over the top and retains the disks at the top edge of the mailer; a spine 608 joins the pockets and retains the disk at the fourth side of the pockets. A registrarion card 640 could be joined to one of the pockets, for instance by perforations at one of the free edges 642.

Figure 7:
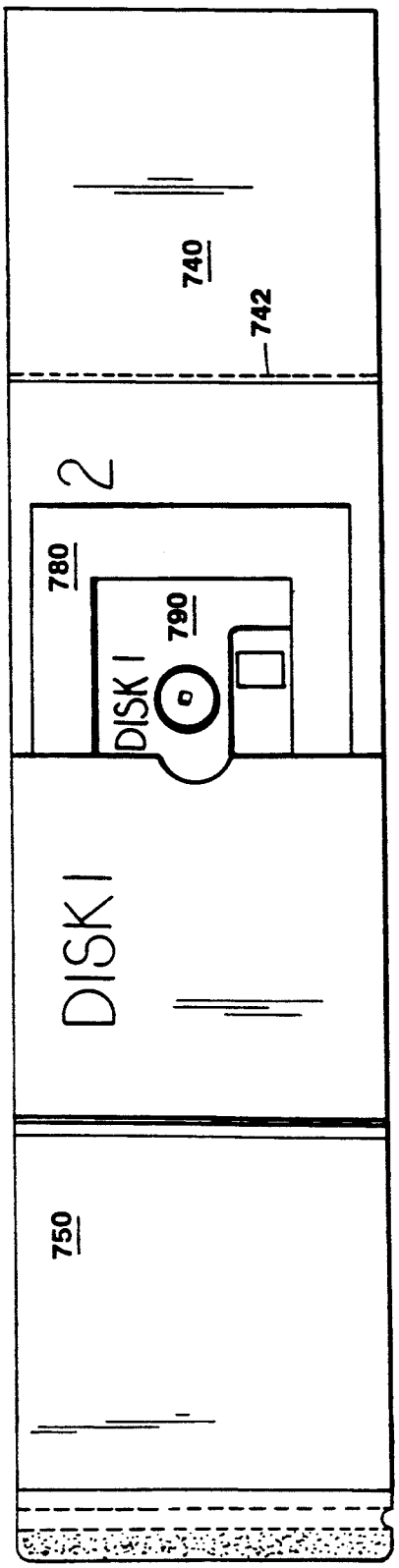
FIGS. 6 and 7 are perspective views of fourth and fifth embodiments.

Referring to FIG. 7, smaller diskettes may be mailed in a mailer intended for larger disks; for instance a 3″ diskette 790 may be used with a mailer for 5¼″ disks by use of a rectangular stabilizing frame 780. The stabilizing frame is preferably of thickness about equal to that of the diskette, having a hole slightly larger than the smaller diskette, and of outer dimension about equal to the dimension of the larger disk normally intended for the mailer. The use of a larger mailer may be required in order to comply with postal regulations that limit the minimum size of an item to be mailed.

In the embodiment of FIG. 7, the sealing flap 750 is substantially the size and shape of the front and back panel members, in contrast to the truncated sealing flaps of the previous embodiments. This provides additional stiffening to the mailer. The registration card 740 is joined to the right pocket at perforations 742.

The means for opening the sealed mailer can be a pull-tab to tear open the sealing flap at perforations, as shown in FIGS. 1, 2, 3, 4, 5, 6, and 7. This serves as a "tamper-evident" seal. Alternately, the adhesive could be of a release-and-reseal type, or a hook-and-loop fastener, and the perforations omitted from the sealing flap, so that the mailer could be opened and resealed multiple times, e.g., for use as an "album folder" storage box.

What is claimed is:

1. A mailer for computer disks, comprising:
   first and second pockets for receiving said disks, each said pocket comprising front and back stiff rectangular panel members joined at their top and bottom edges and unconnected, being open, on at least one side edge of each said pocket,
   a spine foldably attaching said pockets at an edge of each of said pockets,
   a sealing flap foldably connected to said first pocket at the edge of said first pocket remote from said spine, and having an adhesive face configured to permit said sealing flap to be adhered to said second pocket, and
   a card frangibly and foldably connected to an edge of said one pocket remote from said spine,
   wherein said pockets may be folded together at said spine and said adhesive face adhered to said second pocket to maintain the mailer in a closed conformation for mailing.

2. The mailer of claim 1 wherein said adhesive face is covered by a peel-off backing.

3. The mailer of claim 1 wherein said sealing flap is frangibly connected along one edge to said first pocket to facilitate opening of said mailer.

4. The mailer of claim 3 wherein said sealing flap has perforations and a pull tab to facilitate tearing said perforation.

5. The mailer of claim 1 wherein said sealing flap comprises a spacing member between parallel folds between said adhesive face and said edge of said first pocket, of width accommodating the thickness of said first and second pockets and disks for enclosure therein.

6. The mailer of claim 1 wherein an open edge of one of said pockets has a thumb notch to facilitate removal of a disk contained therein.

7. The mailer of claim 1 wherein said spine comprises two parallel folds and a spacing member between of width accommodating the thickness of said first and second pockets and disks for enclosure therein.

8. A mailer for computer disks, comprising:
 a plurality of pockets for receiving said disks, each said pocket comprising a stiff rectangular back panel member joined to a stiff front member at one pair of corresponding edges and unconnected, being open, on one pair of corresponding edges, each pocket foldably attached to each adjacent pocket by a spine positioned between each pair of said pockets,
 a sealing member connected to one of said pockets and having an adhesive face configured to seal said mailer, folded at said spines, in a closed conformation, said mailer in said closed conformation retaining said disks at all four edges of said rectangular back panels, and
 a card foldably connected to an edge of one of said pockets, said connection of said card to said pocket edge being frangible to allow said card to be removed from said mailer.

9. The mailer of claim 8 wherein said sealing member comprises a sealing flap with an adhesive face, said sealing flap connected to one of said pockets, and said adhesive face configured to permit said sealing flap to be adhered to another of said pockets.

10. The mailer of claim 8 wherein said front and back members are essentially the same size, and the front and back members of each pocket are joined at at least two pairs of corresponding edges and unconnected on at least one pair of corresponding edges.

11. The mailer of claim 8 further comprising a card frangibly connected to one of said pockets by a fold at the edge of one of said pockets.

12. The mailer of claim 11 wherein said card, said spine, and said back panel members form a continuous back panel.

13. The mailer of claim 8 wherein said sealing member comprises a sealing flap with an adhesive face, said sealing flap connected to an edge of a first of said pockets by a spacing member between parallel folds between said adhesive face and said edge of said first pocket, of width accommodating the thickness of said pockets and disks enclosed therein, and said adhesive face is configured to permit said sealing flap to be adhered to one side of said mailer.

14. The mailer of claim 13 wherein said adhesive face is covered by a peel-off backing.

15. The mailer of claim 13 wherein said sealing flap is frangibly connected along one edge to said first pocket to facilitate opening of said mailer.

* * * * *